United States Patent Office 3,335,122
Patented Aug. 8, 1967

3,335,122
ORGANOLITHIUM INITIATED
POLYMERIZATION
William J. Trepka, Bartlesville, Okla., assignor to Phillips
Petroleum Company, a corporation of Delaware
No Drawing. Filed Apr. 20, 1964, Ser. No. 361,219
10 Claims. (Cl. 260—94.2)

This invention relates to an improved organolithium polymerization initiator and to the method for making same. In another aspect it relates to a polymerization of vinylidene-containing monomers with a novel organolithium initiator.

Monomers containing vinylidene groups such as conjugated dienes and vinyl-substituted aromatic compounds are readily polymerized with organolithium compounds such as butyllithium. Polymers which are terminally reactive can be formed by using such an initiator and terminating the polymerization with a reagent or reagents so that the lithium atoms present in the polymer are replaced with stable reactive groups. The polymerization reactions proceed to completion in many instances with substantially quantitative production of polymer from the monomers charged, and the molecular weight of the polymer can be regulated to some extent by varying the amount of initiator used. Increasing the concentration of initiator in relation to the monomer charged reduces the molecular weight of the product. In this manner liquid, semi-solid and solid polymers can be prepared.

In following a procedure as above described, controlling the molecular weight is difficult when preparing rubbery polymers or solid resins of high molecular weight. Very small amounts of initiator of the type described are required to produce solid polymers so that accurate regulation of initiator level is difficult. It is desirable, therefore, to find methods of increasing the inherent viscosity of polymers while operating at controllable initiator levels.

I have discovered that a polymerization initiator which is valuable for polymerizing vinylidene-containing monomers can be prepared by reacting an alkyllithiumm compound with a benzyl alcohol or a hydrocarbon-substituted derivative thereof. The reaction product formed by contacting these materials has limited solubility in hydrocarbon solvents and thereby permits more accurate regulation of the inherent viscosity of the polymer formed in a hydrocarbon medium.

It is an object of my invention to provide an improved method for polymerizing vinylidene-containing monomers. Another object is to provide a method for preparing an organolitihum initiator which is sparingly soluble in hydrocarbon solvent. Another object is to provide a polymerization initiator which can be used to polymerize conjugated dienes, such as isoprene or butadiene, in a hydrocarbon solvent to form solid, rubbery polymers having higher inherent viscosity than would be obtained using the same initiator level of an alkyllithium compound. Other objects, advantages and features of my invention will be apparent to those skilled in the art from the following discussion.

The initiators of this invention are made by reacting together an alkyllithium compound and a benzyl alcohol. The alkyl group of the alkyllithium compound preferably contains no more than 12 carbon atoms. Examples of such materials which are suitable include ethyllithium, n-butyllithium, n-hexyllithium, n-dodecyllithium, and the like. The lower alkyllithium derivatives of 2 to 6 carbon atoms are preferred.

The benzyl alcohol compound used in the initiator preparation is represented by the formula:

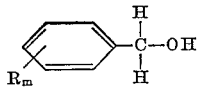

wherein R is a saturated aliphatic or cycloaliphatic radical and $m$ is an integer of 0 to 4 with the total number of carbon atoms in the R groups not exceeding 6. At least one of the positions ortho to the —$CH_2OH$ group should be unsubstituted. Examples of such compounds include benzyl alcohol, 4-methylbenzyl alcohol, 2,4-diethylbenzyl alcohol, 3-cyclopentylbenzyl alcohol, 3,5-diisopropylbenzyl alcohol, 2,3,4,5-tetramethylbenzyl alcohol, 3-methyl-5-n-amylbenzyl alcohol, 4-cyclohexylbenzyl alcohol, and the like.

The initiators are prepared by reacting the benzyl alcohol compound with the alkyllithium in a hydrocarbon diluent. The reaction can be carried out at room temperature but elevated temperatures are preferred, generally in the range of about 100 to 200° F. The reaction mixture should be well agitated. The amount of alkyllithium should be at least stoichiometric and preferably is used in excess. Normally from 2 to 10 moles, and preferably from 3 to 5 moles, of alkyllithium are employed per mole of benzyl alcohol compound.

Suitable hydrocarbon diluents include benzene, toluene, cyclohexane, methylcyclohexane, xylene, n-butane, n-hexane, n-heptane, isooctane, n-dodecane, and similar paraffins, cycloparaffins and aromatics, ordinarily containing about 4 to 10 carbon atoms per molecule. The time required for the preparation of the initiator can vary from a few minutes to several hours, depending upon the conditions and the reactants. As the initiator is formed, being only sparingly soluble in the diluent, it precipitates and can be separated from the reaction medium by any suitable means, such as centrifugation or filtration. This removes unreacted materials and side products and the solid initiator can be washed further and then redispersed in a hydrocarbon.

The vinylidene-containing monomers which can be polymerized by the initiators described herein are preferably the conjugated dienes containing 4 to 12 carbon atoms per molecule and those containing 4 to 8 carbon atoms are more highly preferred. Examples of such conjugated dienes include 1,3-butadiene isoprene, 2,3-dimethyl-1,3 - butadiene, piperylene, 3 - butyl-1,3 - octadiene, 2-phenyl-1,3-butadiene and the like. Conjugated dienes containing halogen and alkoxy substituents such as chloroprene and 2-methoxy-1,3-butadiene can also be used. The conjugated dienes can be formed into homopolymers or copolymers including block copolymers prepared by charging the monomers sequentially.

Also included among the vinylidene-containing monomers are the vinyl-substituted aromatic compounds such as styrene, 1-vinylnaphthalene, 2-vinylnaphthalene and the alkyl, cycloalkyl, aryl, alkaryl, aralkyl, alkoxy, aryloxy, and dialkylamino derivatives thereof in which the total number of the carbon atoms in the combined substituents does not exceed 12. Examples include 3-methylstyrene, 4-dodecylstyrene, 4-cyclohexylstyrene, 2-ethyl-4-benzylstyrene, 4-methoxystyrene, 4-dimethylaminostyrene, 3,5-diphenoxystyrene, 4-p-tolylstyrene, 4 - phenylstyrene, 4,5-dimethyl-1-vinylnaphthalene, 3-n-propyl-2-vinylnaphthalene, and the like. These vinyl-substituted aromatic compounds can be used to form homopolymers or copolymers including block copolymers with each other or with conjugated dienes.

In addition, certain polar monomers can be polymerized to form homopolymers or copolymers with each other or copolymerized with conjugated dienes and/or vinyl-substituted aromatic compounds. Block copolymers of these monomers can be prepared by introducing the polar monomer after the non-polar monomer has polymerized. These include the vinylpyridines and the vinylquinolines in which the vinyl group is attached to a ring carbon other than a carbon in the beta position with respect to the nitrogen. Examples are the pyridine, quinoline or isoquinoline derivatives corresponding to those described in connection with the vinyl-substituted aromatic compounds. Examples include 2-vinylpyridine, 5-cyclohexyl-2-vinylpyridine, 6-methoxy-2-vinylpyridine, 3-benzyl-4-vinylpyridine, 4-phenyl-2-vinylpyridine, 4-dimethylamino-2-vinylquinoline, 3-vinylisoquinoline and the like. Other polar monomers include methyl acrylate, ethyl acrylate, methyl methacrylate, butyl methacrylate, acrylonitrile, methacrylonitrile, N,N-dimethylacrylamide, and similar acrylic and alkacrylic acid esters, nitriles and N,N-disubstituted amides. Vinylfuran and N-vinylcarbazole can also be used.

The polymerizations are carried out in predominantly hydrocarbon liquid diluents at temperatures in the range of about −100 to +150° C., preferably between −75 and +75° C. The most desirable temperature depends upon the monomers and the initiator used in the polymerization. The amount of initiator charged can vary considerably because of its limited solubility but ordinarily the amount used is in the range of about 0.5 to 200, preferably 1 to 150 milliequivalents per 100 grams of monomers. The milliequivalents of initiator used in the polymerizations is based upon the total lithium present in the initiator composition as determined by titration or by calculation from the molarity, knowing the number of lithium atoms in each molecule of initiator.

The initiator can be titrated by hydrolyzing a sample of the product with water and then titrating the lithium with HCl. The polymerization diluent is suitably a hydrocarbon of the same type previously described for preparation of the initiator.

The polymerization mixture should be agitated and the reaction time can extend from a few minutes to 100 hours or more. Usually a short induction period is required but in the time allowed for the polymerization the conversions can be expected to be nearly quantitative. At the end of the reaction the initiator can be inactivated and the polymer coagulated by adding an acid or alcohol. The polymer is then separated, washed and dried using conventional recovery techniques.

In order to introduce functional groups in the polymer in place of the lithium atoms, it is necessary to treat the polymer solution before inactivating the initiator with water, alcohol or acid. The polymer solution can be treated with carbon dioxide to introduce carboxy groups, with a cyclic disulfide or sulfur to introduce mercapto groups, with aldehydes, ketones or epoxy compounds such as acetaldehyde, acetone or ethylene oxide to introduce hydroxy groups, with carbon disulfide to introduce carbodithio groups, and the like. It is ordinarily necessary to remove the lithium atoms from the salt which forms in the termination reaction by hydrolysis using alcohol, acid or water.

The polymer can be coupled while it still contains an active terminal lithium atom by selection of the type and amount of terminating agent used. For example, carbon dioxide, depending upon the amount used, can either couple the polymer or terminate it with carboxy groups. Also the polymer containing terminal reactive groups can be coupled by reaction with a polyfunctional compound. For example, a diisocyanate can be used to couple a polymer containing terminal hydroxy groups or a polyaziridinyl compound to couple a carboxy terminated polymer.

The following examples are presented as illustrative of the invention. It is not intended, however, that the invention should be limited thereto.

EXAMPLE I

A polymerization initiator was prepared by reacting n-butyllithium with benzyl alcohol. The following recipe was employed:

| | |
|---|---|
| Benzyl alcohol, mole | 0.025 |
| n-Butyllithium, mole | 0.083 |
| Toluene (100 ml.), mole | 0.94 |
| Time, hours | 192 |
| Temperature, °F. | 122 |

Toluene was charged to the reactor after which it was purged with nitrogen. Benzyl alcohol was then added, the mixture was cooled to ice bath temperature, and the butyllithium was charged. The temperature was increased to 122° F. and the reactants were agitated for 192 hours. The liquid mixture was centrifuged to separate the solid reaction product. The supernatant liquid was discarded, the precipitate was washed once with toluene and then with n-pentane to remove unreacted butyllithium. The washings were discarded and the solid product was dispersed in n-pentane. Total volume of the final dispersion was 70 milliliters. It had a normality of 0.48. Total alkalinity of the dispersion expressed as equivalents of lithium was 0.082.

The reaction product of butyllithium was benzyl alcohol was employed as the initiator for the polymerization of isoprene. A series of runs was made using variable amounts of initiator. The recipe was as follows:

| | |
|---|---|
| Isoprene, part by weight | 100 |
| n-Pentane, parts by weight | 1000 |
| Initiator, milliequivalents | Variable |
| Time, hours | 24 |
| Temperature, °F. | 122 |

The diluent was charged first, the reactor was then purged with nitrogen, and isoprene was added. The initiator was introduced last. The reactants were agitated throughout the polymerization period. At the close of the polymerizations the reactions were terminated by the addition of an isopropyl alcohol solution of 2,2′-methylene-bis(4-methyl-6-tert-butylphenol), the amount used being sufficient to provide one part by weight of the antioxidant per 100 parts of rubber. The polymers were coagulated with isopropyl alcohol, separated, and dried. Microstructure, inherent viscosity, and gel were determined on each of the products. The results are summarized in the following table.

| Run No. | Initiator, meq./hm.[1] | Conversion, percent [2] | Microstructure, percent [2] | | Inherent Viscosity | Gel, percent |
|---|---|---|---|---|---|---|
| | | | Cis | 3,4-add'n | | |
| 1 | 10 | 100 | 78.1 | 9.0 | 5.97 | 0 |
| 2 | 5 | 100 | 85.8 | 7.6 | 11.05 | 0 |
| 3 | 4.6 | 100 | 85.8 | 7.4 | 11.19 | 0 |

[1] Milliequivalents per 100 grams monomer.
[2] Raw values.

The above data show that polymers having high inherent viscosity can be formed at controllable initiator levels. A corresponding amount of butyllithium used as the initiator would produce a polymer of considerably lower molecular weight.

EXAMPLE II

A polyisoprene prepared as described in Example I with an initiator level of 4.4 milliequivalents per 100 grams of isoprene and having a cis-content of 84.2 percent and a Mooney value (ML–4 at 212° F.) of 62.0 was evaluated in a treadstock recipe. Mixing was done in a Midget Banbury. Processing was good and adequate breakdown of the rubber was achieved in a single mixing cycle (6 minutes) at 290° F. The compounding recipe, data on the processing properties, and properties of the vulcanized stock are presented in the following table:

*Compounding recipe, parts by weight*

| | |
|---|---|
| Polymer | 100 |
| High abrasion furnace black | 50 |
| Zinc oxide | 3 |
| Stearic acid | 3 |
| Flexamine [1] | 1 |
| Flexzone 3C [2] | 2 |
| Aromatic oil (Philrich 5) | 5 |
| Pepton 22 [3] | 1 |
| Sulfur | 2.25 |
| NOBS Special [4] | 0.5 |

*Processing properties*

| | |
|---|---|
| Compounded MS–1½ at 212° F | 31.8 |
| Extrusion at 195° F.: | |
| Inches/minute | 66.5 |
| Grams/minute | 121 |
| Rating (Garvey die) | 11– |

*Physical properties (cured 45 minutes at 293° F.)*

| | |
|---|---|
| $\nu \times 10^4$, moles/cc.[5] | 1.46 |
| 300% modulus, p.s.i.[6] | 1290 |
| Tensile, p.s.i.[6] | 2990 |
| Elongation, percent [6] | 540 |
| Max. tensile at 200° F., p.s.i | 1885 |
| ΔT, ° F.[7] | 42.1 |
| Resilience, percent [8] | 70.9 |
| Shore A hardness [9] | 56 |

[1] Physical mixture containing 65 percent of a complex diarylamine-ketone reaction product and 35 percent of N,N'-diphenyl-p-phenylenediamine.
[2] N-isopropyl-N'-phenyl-p-phenylenediamine.
[3] Di-o-benzamidophenyl disulfide.
[4] N-oxydiethylene-2-benzothiazyl sulfenamide.
[5] Swelling method of Kraus, Rubber World 135, 67–73, 254–260 (1956). This value is the number of network chains per unit volume of rubber. The higher the number, the more the rubber is crosslinked (vulcanized).
[6] ASTM D412–61T. Scott Tensile Machine L–6. Tests made at 80° F.
[7] ASTM D623–58. Method A. Goodrich Flexometer, 143 lbs./sq. in. load, 0.175 inch stroke. Test specimen is a right circular cylinder 0.7 inch in diameter and one inch high.
[8] ASTM D945–59 (modified). Yerzley Oscillograph. Test specimen is a right circular cylinder 0.7 inch in diameter and one inch high.
[9] ASTM D676–59T. Shore durometer, type A.

The vulcanized rubber had good properties, as shown by the data. The rubbery polymers prepared by this process can be used for the manufacture of automobile and truck tires.

EXAMPLE III n-Butyllithium was reacted with benzyl alcohol using the following recipe:

| | |
|---|---|
| Benzyl alcohol, mole | 0.10 |
| n-Butyllithium, mole | 0.332 |
| Toluene (400 ml.), moles | 3.8 |
| Time, hours | 192 |
| Temperature, ° F | 122 |

The procedure was the same as described in Example I. The total volume of the dispersion was 671 milliliters and the total alkalinity, expressed as equivalents of active lithium, was 0.311. Normality of the dispersion was 0.46. This dispersion was employed as the initiator in a series of runs for the polymerization of butadiene. The following recipe was used:

| | |
|---|---|
| 1,3-butadiene, parts by weight | 100 |
| Cyclohexane, parts by weight | 780 |
| Initiator, milliequivalents | Variable |
| Time, hours | 24 |
| Temperature, ° F | 122 |

Procedure for polymerization and recovery of the polymers was the same as in Example I. Results are summarized in the following table:

| Run No. | Initiator, meq./hm. | Conversion, percent | Microstructrue, percent | | | Inherent Viscosity | Gel, percent |
|---|---|---|---|---|---|---|---|
| | | | Cis | Trans | Vinyl | | |
| 1 | 5 | 100 | 60.2 | 34.2 | 5.6 | 6.34 | 0 |
| 2 | 3 | 100 | 83.5 | 21.9 | 4.6 | 9.15 | 0 |
| 3 | 2.8 | 100 | 75.5 | 20.7 | 3.8 | 9.69 | 0 |
| 4 | 2.6 | 100 | 78.0 | 17.9 | 4.1 | 10.66 | 0 |

The above data show the reaction product of n-butyllithium and benzyl alcohol is an effective initiator for polymerization of butadiene and that the initiator level can be varied within a convenient range to form polymers of relatively high inherent viscosity.

Attempts to prepare polymerization initiators by reacting an alkyllithium with benzylamine and benzylmercaptan was not successful as no precipitate formed as in the case with benzyl alcohol.

In the above examples, microstructure, inherent viscosity and gel were determined for the polymers according to the following procedures:

Microstructures were determined with a commercial infrared spectrometer. For polyisoprene the samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis polyisoprene, trans is not detectable, since trans is measured at the 8.75 micron band. The raw cis and raw 3,4-addition can be converted to normalized values by changing each value proportionally so that their sum equals 100%. For polybutadiene, similar polymer solutions were formed and the percent of the total unsaturation present as trans 1,4- was calculated according to the following equation and consistent units:

$$\epsilon = \frac{E}{tc}$$

where $\epsilon$=extinction coefficient (liters - mols$^{-1}$ - centimeters$^{-1}$); $E$=extinction (log $I_0/I$); $t$=path length (centimeters; and $c$=concentration (moles double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each C$_4$ unit in the polymer.

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

As will be apparent to those skilled in the art, various modifications can be made in this invention without departing from the spirit or scope thereof.

I claim:

1. A polymerization initiator which is the solid reaction product of an alkyllithium having up to 12 carbon atoms per molecule and a benzyl alcohol compound having the formula

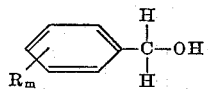

wherein R is selected from the group consisting of saturated aliphatic radicals and saturated cycloaliphatic radicals and $m$ is an integer of 0 to 4, the total number of carbon atoms in the combined R groups not exceeding 6 and at least one of the positions ortho to the —CH$_2$OH group being unsubstituted.

2. An initiator composition which is the solid reaction product in a hydrocarbon diluent of n-butyllithium and benzyl alcohol.

3. A method of making a polymerization initiator which comprises contacting an alkyllithium having up to 12 carbon atoms per molecule with a benzyl alcohol compound having the formula

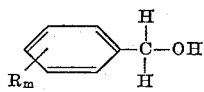

wherein R is selected from the group consisting of saturated aliphatic radicals and saturated cycloaliphatic radicals, and $m$ is an integer of 0 to 4, the total carbon atoms in the combined R groups not exceeding 6, at least one of the positions ortho to the —CH$_2$OH groups being unsubstituted, in a hydrocarbon diluent.

4. A method of making a polymerization initiator which comprises reacting from 2 to 10 mole proportions of an alkyllithium having 2 to 6 carbon atoms per molecule with one mole proportion of a benzyl alcohol compound having the formula

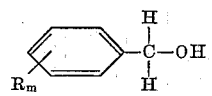

wherein R is selected from the group consisting of saturated aliphatic radicals and saturated cycloaliphatic radicals, $m$ is an integer of 0 to 4, the total carbon atoms in the combined R groups not exceeding 6, at least one of the positions ortho to the —CH$_2$OH groups being unsubstituted, in a hydrocarbon diluent at a temperature in the range of 100 to 200° F. and recovering the precipitate which forms.

5. The process of claim 4 wherein said alkyllithium is n-butyllithium and said benzyl alcohol compound is benzyl alcohol.

6. A polymerization process which comprises contacting a vinylidene-containing monomer under polymerization conditions in a hydrocarbon diluent with an initiator sparingly soluble in said diluent, said initiator being a solid reaction product of an alkyllithium having up to 12 carbon atoms per molecule with a benzyl alcohol compound having the formula

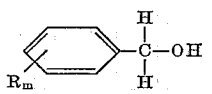

wherein R is selected from the group consisting of saturated aliphatic radicals and saturated cycloaliphatic radicals and $m$ is an integer of 0 to 4, the total number of carbon atoms in the combined R groups not exceeding 6 and at least one of the positions ortho to the —CH$_2$OH group being unsubstituted.

7. The process of claim 6 wherein said vinylidene-containing monomer is isoprene.

8. The process of claim 6 wherein said vinylidene-containing monomer is butadiene.

9. The process of claim 6 wherein the initiator is the reaction product of n-butyllithium and benzyl alcohol.

10. A polymerization process which comprises contacting a conjugated diene having 4 to 12 carbon atoms per molecule under polymerization conditions in a hydrocarbon diluent with an initiator sparingly soluble in said diluent, said initiator being a solid reaction product formed by contacting a stoichiometric excess of alkyllithium having 2 to 6 carbon atoms per molecule with a benzyl alcohol compound having the formula

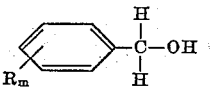

wherein R is selected from the group consisting of saturated aliphatic radicals and saturated cycloaliphatic radicals and $m$ is an integer of 0 to 4, the total number of carbon atoms in the combined R groups not exceeding 6, at least one of the positions ortho to the —CH$_2$OH groups being unsubstituted, and recovering a solid rubbery polymer.

No references cited.

JOSEPH L. SCHOFER, *Primary Examiner.*

H. I. CANTOR, *Assistant Examiner.*